United States Patent
Kobayashi

[11] Patent Number: 5,946,112
[45] Date of Patent: Aug. 31, 1999

[54] IMAGE PROCESSING APPARATUS AND METHOD

[75] Inventor: Noriyuki Kobayashi, Hiratsuka, Japan

[73] Assignee: Canon Kabushiki Kaisha, Tokyo, Japan

[21] Appl. No.: 08/449,573

[22] Filed: May 24, 1995

[30] Foreign Application Priority Data

May 31, 1994 [JP] Japan .................................. 6-118623

[51] Int. Cl.⁶ .............................. H04N 1/46; H04N 1/56
[52] U.S. Cl. ........................................... 358/518; 358/515
[58] Field of Search ................................ 358/515, 516, 358/517, 518, 522

[56] References Cited

U.S. PATENT DOCUMENTS

| | | | |
|---|---|---|---|
| 5,329,385 | 7/1994 | Washio | 358/515 |
| 5,398,123 | 3/1995 | Katsuma | 358/518 |
| 5,495,348 | 2/1996 | Sakai et al. | 358/501 |
| 5,581,359 | 12/1996 | Kaburagi et al. | 358/298 |
| 5,581,377 | 12/1996 | Shimizu et al. | 358/540 |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image processing apparatus which provides image data to an image forming apparatus capable of forming an image by overlaying recording material of at least two colors separates color image data into at least two color component image data, and performs a first correction in consideration of a light-shielding effect and a second correction so as to maintain a density ratio of each color component image data. Then, in accordance with a density value of a second color component image data applied with the first correction, either a first corrected result or a second corrected result is selected. Thereby, decrease of a density value caused by the light-shielding effect is corrected, further correction for maintaining color balance can be performed.

24 Claims, 8 Drawing Sheets

FIG. 8

IMAGE PROCESSING APPARATUS AND METHOD

BACKGROUND OF THE INVENTION

The present invention relates to an image processing apparatus and method, more particularly, to an image processing apparatus and method capable of forming an image in at least two colors collectively before transferring to a recording medium.

Conventionally, a two-color digital copy machine is available as an image processing apparatus capable of forming an image in two different colors, such as black and red, collectively.

In the conventional two-color digital copy machine, a photoelectric converter, such as a color CCD, scan a color original image as RGB signals. And the RGB signals are converted to CMYK signals. Then, an image area is recognized and separated from the CMYK signals, and image data for forming a latent image for a first color and image data for forming a latent image for a second color are generated from the separated image area. Thereafter, the latent image of image data corresponding to the first color is formed on an electrostatic drum by using a laser beam, and a latent image of image data corresponding to the second color is formed on the same electrostatic drum over the latent image for the first color. By transferring the two latent images for two colors formed on the single electrostatic drum at once, an image of two color is visualized on a recording medium.

In the aforesaid two-color digital copy machine, since the latent image for the second color is formed over the latent image for the first color, the second color is not reproduced in its original color because of a light-shielding effect of the latent image for the first color which is exposed in prior against a laser beam. Thus, the colors are not mixed properly, which causes the deterioration of quality of an image.

Therefore, in the two-color digital copy machine, a method for correcting density values of image data of the second color is suggested by U.S. patent application Ser. No. 08/312,937 in order to solve the problem in which the second color is deteriorated. For example, a method to increase the density value of the second color in accordance with a predetermined ratio or a ratio corresponding to the density value is suggested. On the contrary, a method to decrease the density value of the first color in accordance with a predetermined ratio or a ratio corresponding to the density value is suggested. Then, by forming latent images for each color in accordance with the corrected density values, the deterioration of the second color is prevented. However, it has not been possible to preserve density ratio of a density value of the first color to that of the second color and to preserve the density values of both the first and second colors together at one time, when the correcting method for the second color is applied to the conventional two-color digital copy machine.

SUMMARY OF THE INVENTION

The present invention has been made in consideration of the above situation, and has its object to provide an image processing apparatus and method capable of holding toner images of two (or a plurality of) colors on an electrostatic drum at the same time by repeating formation of latent images for two (or a plurality of) colors and development on the single electrostatic drum and transferring the toner images on the recording medium together at one time, and an image processing apparatus and method capable of preserving a color density ratio of a density value of the first color and a density value of the second color in compatible with preserving the density values of the two (or the plurality of) colors.

It is another object of the present invention is to provide an image processing apparatus and method capable of performing proper corrections in consideration with a light-shielding effect of an image when the image is formed by overlaying recording material of at least two colors.

According to the present invention, the foregoing object is attained by providing an image processing apparatus which provides image data to an image forming apparatus capable of forming an image by overlaying recording material of at least two colors, comprising: separating means for separating color image data into at least two color components; first correcting means for performing correction on the image data separated by the separating means in consideration of light-shielding effect on an image represented by the image data; second correcting means for performing correction on the image data separated by the separating means in consideration of a density ratio of the image data; and processing means for processing the image data separated by the separating means by using the first correcting means and the second correcting means.

Further, the foregoing object is also attained by providing an image processing apparatus which provides image data to an image forming apparatus capable of forming an image by overlaying recording material of at least two colors, comprising: separating means for separating color image data into at least two color component image data; first correcting means for performing correction on second color component image data representing an image formed later, out of the color component data separated by the separating means, in consideration of light-shielding effect of an image, represented by first color component image data, which is formed in prior; second correcting means for performing correction so as to maintain a density ratio of the first color component image data to the second color component image data separated by the separating means; comparing means for comparing a density value of the second color component image data corrected by the first correcting means with a predetermined value; and selecting means for selecting either a corrected result by the first correcting means or a corrected result by the second correcting means in accordance with a comparison result by the comparing means.

Furthermore, the foregoing object is also attained by providing an image processing apparatus which provides image data to an image forming apparatus capable of forming an image by overlaying recording material of at least two colors, comprising: separating means for separating color image data into at least two color component image data; first correcting means for performing correction on second color component image data representing an image formed later, out of the color component data separated by the separating means, in consideration of light-shielding effect of an image, represented by first color component image data, which is formed in prior; second correcting means for performing correction so as to maintain a density ratio of the first color component image data to the second color component image data separated by the separating means; comparing means for comparing a density value of the second color component image data corrected by the first correcting means with a predetermined value; and selecting means for selecting the first color component image data and the second color component image data in accordance with a comparison result by the comparing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

In a first embodiment, as an image processing apparatus capable of forming an image in two colors, an image forming apparatus which forms an image in black and red is explained below.

Figure 1:
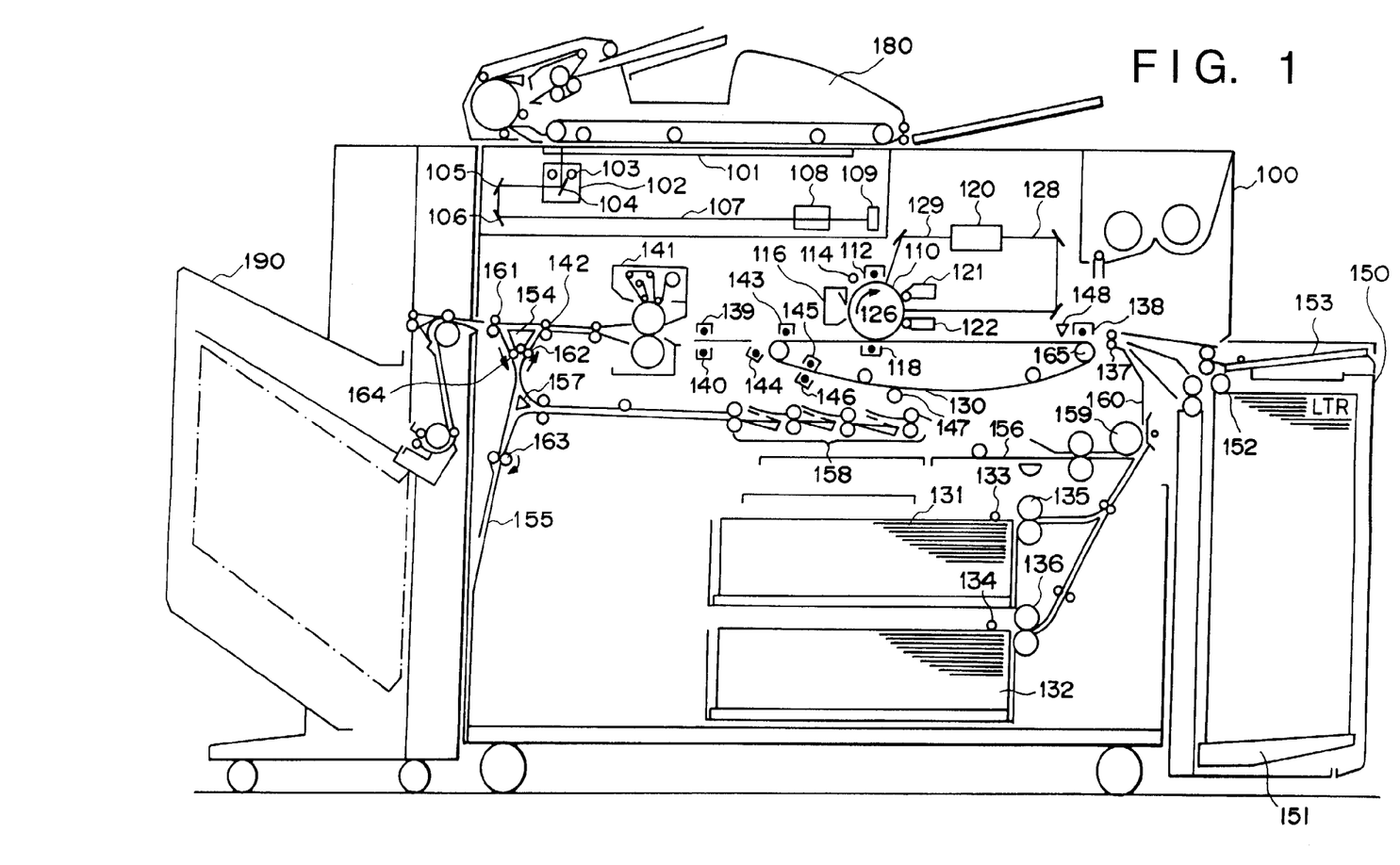
FIG. 1 is a cross sectional view of an image processing apparatus according to a first embodiment of the present invention.

In FIG. 1, reference numeral 100 denotes a main body of the image processing apparatus; 180, a circulating-type automatic document feeder (abbreviated as "RDF", hereinafter) which feeds an original automatically; and 190, a sorter. The RDF 180 and the sorter 190 can be used in arbitrary combination with the main body of the image processing apparatus 100.

Further in FIG. 1, reference numeral 101 denotes a platen glass as a platen; and 102, a scanner consists of a document illuminating lamp 103, a scanning mirror 104 and the like. The scanner 102, driven by a motor (not shown), scans an original in a predetermined back and forth direction. The reflected light from the original focuses on a CCD sensor 109 via scanning mirrors 104 to 106 and through a lens 108.

Reference numeral 120 denotes an exposure controller which consists of a laser, a polygon scanner and the like, and it emits laser beams 128 and 129, modulated in accordance with image signals which are converted into electrical signals in an image sensor 109 and which are applied with predetermined processes (will be described later), on an electrostatic drum 110.

Around the electrostatic drum 110, a primary corona discharge device 112, a red developer 121, a black developer 122, a transfer corona discharge device 118, a cleaning device 116, and a pre-exposure lamp 114 are arranged.

In an image forming unit 126, the electrostatic drum 110 rotates in the direction of an arrow, shown in FIG. 1, driven by a motor (not shown). After it is charged to a desired potential by the primary corona discharge device 112, it is illuminated by the laser beam 129 from the exposure controller 120, thereby an electrostatic latent image for red data is formed. The electrostatic latent image formed on the electrostatic drum 110 is developed by the red developer 121 and visualized as a toner image. Then, the laser beam 128 from the exposure controller 120 is illuminated on the electrostatic drum 110, thereby an electrostatic latent image for black data is formed. The electrostatic latent image formed on the electrostatic drum 110 is developed by the black developer 122 and visualized as a toner image.

A transfer paper sheet is fed from an upper paper feed tray 131 or a lower paper feed tray 132 by a paper feed rollers 133 and 134. The transfer paper sheet is conveyed to the main body by paper feed rollers 135 and 136 and further conveyed by a resist roller 137 to a transfer belt 130 where the visualized toner images are transferred to the transfer paper by the transfer corona discharge device 118. As described above, in the image processing apparatus of this embodiment, toner images of the two (or a plurality of) colors are formed on the electrostatic drum at the same time, and the toner images are transferred to a recording paper sheet together at one time, thereby an image is formed.

After the transference, the remained toner and charge on the electrostatic drum 110 are removed by the cleaning device 116 and the pre-exposure lamp 114, respectively.

The transfer paper sheet after the transference is separated from the transfer belt 130, then the toner image on the transfer paper is recharged by pre-fixing chargers 139 and 140. The transfer paper sheet is conveyed to a fixing device 141 where the toner image is fixed by being applied with pressure and heat. After that, the transfer paper sheet is ejected outside of the main body 100 of the image processing apparatus by an ejecting roller 142.

Reference numeral 138 denotes an attracting corona discharge device which make the transfer paper sheet sent from the resist roller 137 attracted by the transfer belt 130, and reference numeral 165 denotes a transfer belt roller which is used for driving the transfer belt 130 as well as used in a pair with the attracting corona discharge device 138 to charge the transfer paper sheet so as to be attracted by the transfer belt 130.

Reference numeral 143 denotes a charge removing corona discharge device for making the transfer paper sheet easily separated from the transfer belt 130; 144, a separating corona discharge device for preventing the image on the transfer paper sheet from being deteriorated because of discharge when the transfer paper sheet is separated from the transfer belt 130; 139 and 140, the pre-fixing chargers for supplementing attracting power of the toner on the transfer paper sheet after the separation so as to prevent the image from being deteriorated; 145 and 146, transfer belt charge removing corona discharge devices which discharges the transfer belt 130, thereby initialize the transfer belt 130 electrostatically; and 147, a belt cleaner for cleaning the transfer belt 130.

A paper sensor 148 detects a front edge of the transfer paper sheet on the transfer belt 130, and the detected result is used as a synchronizing signal of the paper feed direction (sub-scanning direction).

The main body 100 is provided with a deck 150 which can store 4000 sheets of transfer paper, for instance. A lifter 151 in the deck 150 moves upward depending on the amount of the remaining transfer paper sheets so that the top of a pile of the transfer paper sheets always touches a paper feed roller 152. Further, a multi manual paper feeder which may hold 100 sheets of transfer paper is provided.

Further, in FIG. 1, a paper-ejecting flapper 154 changes paths of the transfer paper sheet, sent from the ejecting roller 142, for double-sided recording (double-sided copying), overlay-recording (overlay copying), and the ejecting to a sorter 190. Reference numeral 155 denotes a reversal path for turning the transfer paper sheet upside-down; 158, a lower conveying path. The transfer paper sheet sent from the ejecting roller 142 is turned upside-down by passing through the reversing path 155, and guided to a paper refeed tray 156 via the lower conveying path 158.

A multiple-recording flapper 157 changes paths of the transfer paper sheet for double-sided recording and overlay-recording. By rotating down to the left side, the transfer paper sheet is directly guided to the lower conveying path 158 without passing through the reversal path 155. A paper feed roller 159 feeds the transfer paper sheet to the side of the electrostatic drum 110 via a path 160. An ejecting roller 161 is provided near a paper-ejecting flapper 154, and ejects the transfer paper sheet to the outside of the apparatus (sorter 190) when a path selected by the paper-ejecting flapper 154 is on the ejecting side.

When a double-sided recording is to be operated, the paper-ejecting flapper 154 is turned up and the multiple-recording flapper 157 is turned to the right in FIG. 1, thereby the transfer paper sheet which is already printed is stored upside-down in the paper refeed tray 156 via the paths 155 and 158. Further, when the overlay-recording is to be operated, the paper-ejecting flapper 154 is turned up and the multiple-recording flapper 157 is turned to the left in FIG. 1, thereby the transfer paper sheet which is already copied is restored in the paper refeed tray 156 via the lower conveying path 158. Then, in the both cases of the double-sided recording and the overlay-recording, the transfer paper sheet stored in the paper refeed tray 156 is fed by the paper feed roller 159 one at a time from the bottom of a pile of the recording paper sheets to the resist roller 137 of the main body via the path 160.

Whereas, when the paper-ejecting flapper 154 is turned down, the transfer paper sheet is ejected without being processed with any further operations such as the double-sided recording and the overlay-recording. Further, in order to eject the transfer paper sheet upside-down, the paper-ejecting flapper 154 is turned up and the multiple-recording flapper 157 is turned to the right in FIG. 1, thereby the recording paper sheet which is already copied is transmitted to the reversal path 155. After a rear end of the transfer paper has passed through a first conveying roller 162, it is conveyed to the side of a second conveying roller 164 by the reversal roller 163, then the recording paper sheet, turned upside-down, is ejected to the sorter 190 by the ejecting roller 161.

Figure 2:
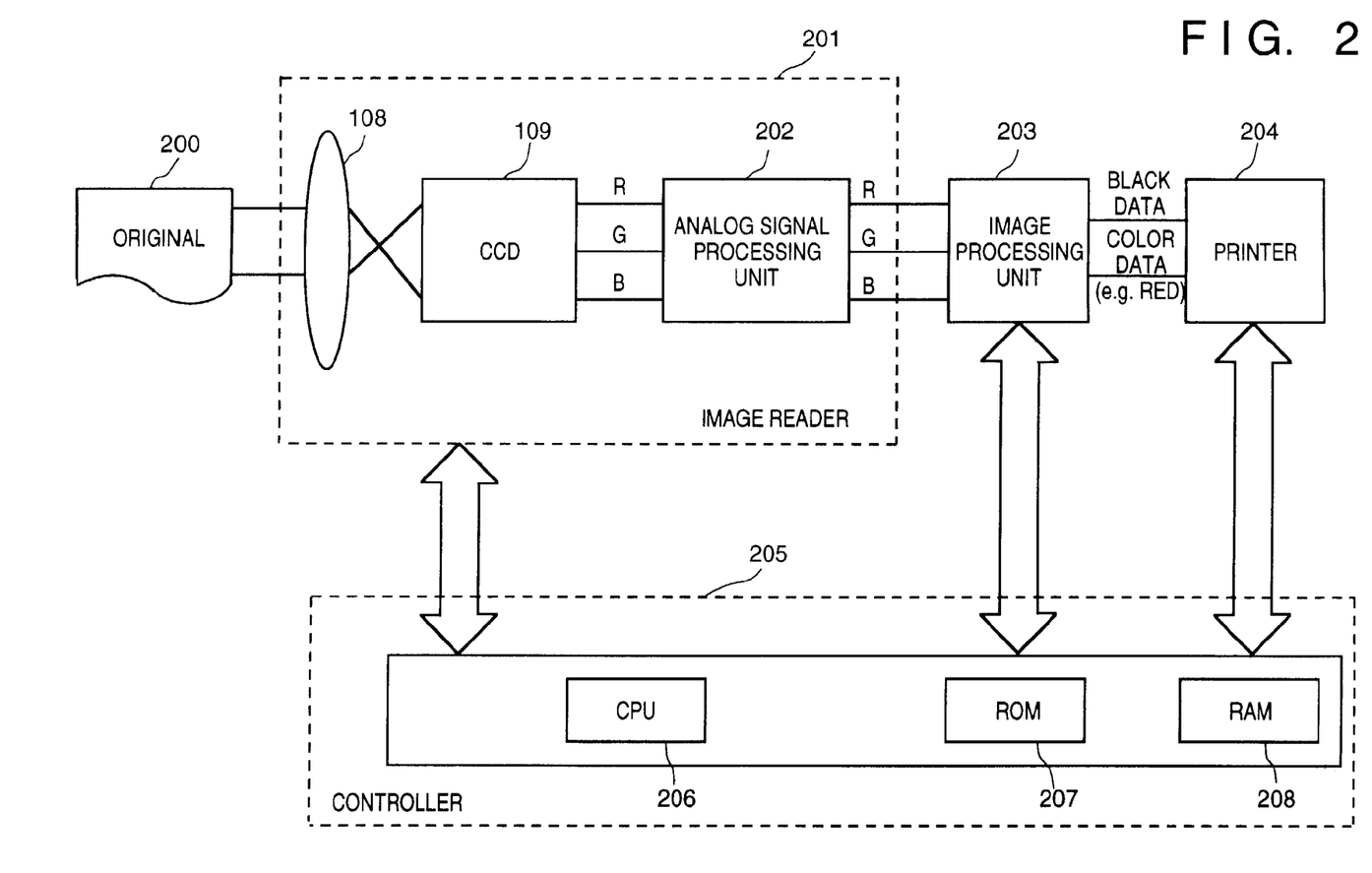
FIG. 2 is a block diagram showing a configuration of the image processing apparatus according to the first embodiment.

Next, flows of signals in the image processing apparatus of the first embodiment will be shown in a block diagram in FIG. 2.

In FIG. 2, image information of an original 200 is read by an image reader 201. The image reader 201 consists of a CCD sensor 109, an analog signal processing unit 202 and so on. The image information of the original 200, focused on the CCD sensor 109 through a lens 108, is converted into electric analog signals of R(red), G(green), and B(blue). The converted image information enters the analog signal processing unit 202 where the signals are applied with processes, such as sample and hold, correction in dark level and the like, by R, G, B color signals. Then, the image information is converted from the analog signals to digital signals (A/D conversion), and the digitized full-color R, G, B signals enter an image processing unit 203.

In the image processing unit 203, the inputted digital color image signals are applied with correcting processes which are necessary at an image reading unit, such as shading correction, color correction, γ correction, and smoothing correction, edge enhancement, and processes which are specific in this embodiment and will be described later. The digital color image signals are then outputted to a printer 204 as black data and red data.

As described above with reference to FIG. 1, the printer 204 is constructed with the exposure controller 120, the image forming unit 126, a controller for controlling conveyance of the transfer paper sheet, and the like. The printer 204 records an image on the transfer paper sheet on the basis of image signals processed in the image processing unit 203.

Further, the controller 205 consists of a CPU 206, a ROM 207, a RAM 208, and so on. The controller 205 controls the image reader 201, the image processing unit 203 and the printer 204 by executing a program stored in the ROM 207 by the CPU 206, consequently, it generally controls an image processing sequence of this embodiment.

The aforesaid image processing unit 203 will be described in detail with reference to FIG. 3.

Figure 3:
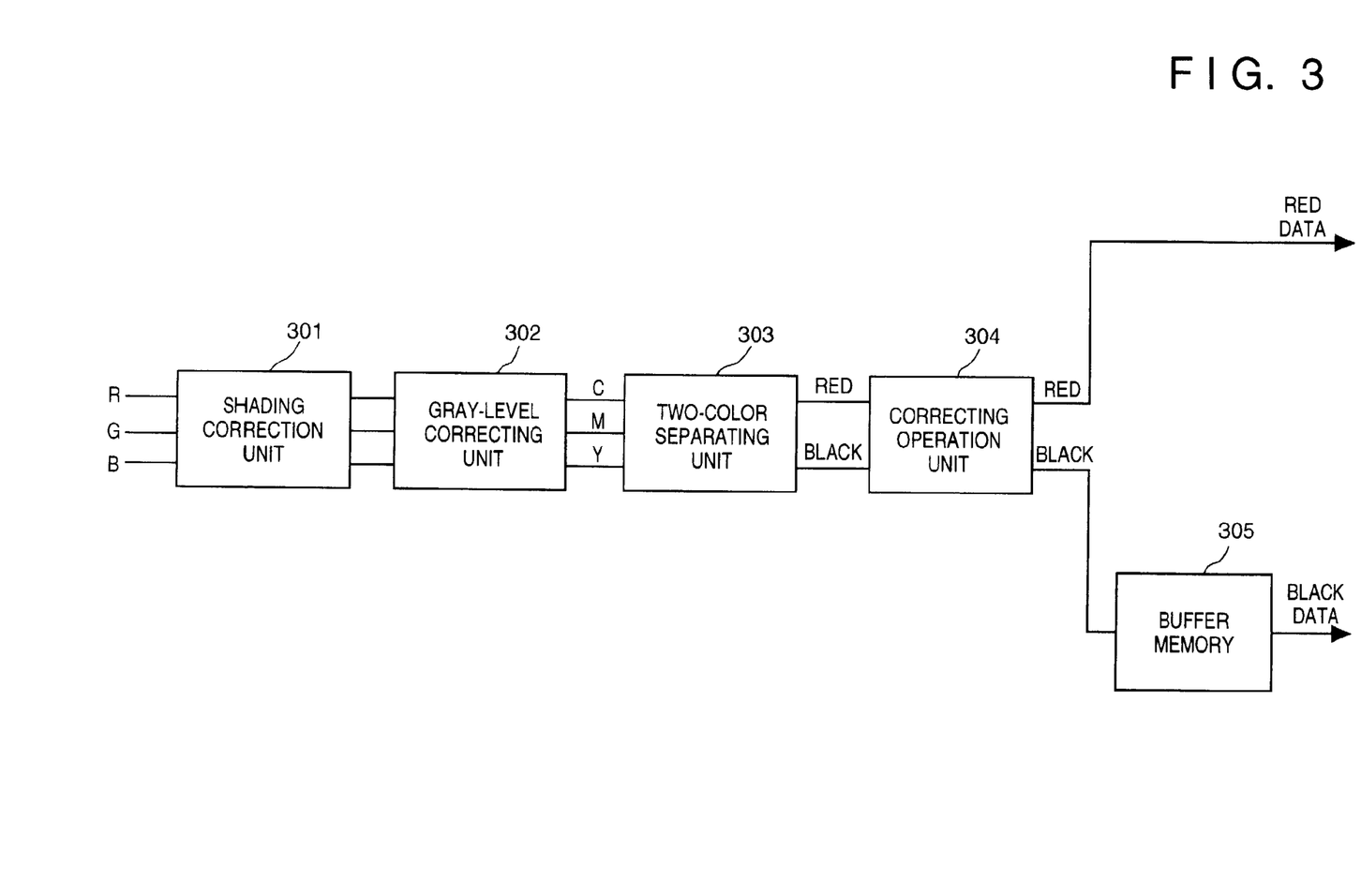
FIG. 3 is a block diagram showing a detailed configuration of an image processing unit 203 according to the first embodiment.

FIG. 3 is a block diagram showing a detailed configuration of the image processing unit 203.

The digital image signals of R, G, and B outputted from the analog signal processing unit 202 is first inputted in a shading correction unit 301, shown in FIG. 3, of the image processing unit 203. The shading correction unit 301 compensates for variance in the CCD sensor 109 which is used for reading the original, and corrects distribution-of-light characteristic of a lamp 103 for illuminating the original. The image signals of R, G, and B, which have been subjected to correcting operations in the shading correction unit 301 are next inputted into a gray-level correcting unit 302 where the image signals are converted from luminance signals to density signals by using logarithm. Thus, density image data of signals of complementary colors of R, G, and B, namely C(cyan), M(magenta), and Y(yellow) are generated.

Then, the image signals which are now converted into the density signals of C, M, and Y enter a two-color separating unit 303 which generates image data of red and black which are toner colors provided in the printer 204 (referred as "red data" and "black data", hereinafter). The red data and the black data outputted from the two-color separating unit 303 enters a correcting operation unit 304 which is a feature of the first embodiment, and the data is applied with a correction for mixing colors most suitably on the single electrostatic drum 110. The operation in the correcting operation unit 304 will be described later in detail.

From the correcting operation unit 304, the corrected red data and the corrected black data is separately outputted. The black data is temporarily stored in a buffer memory 305, thereby it is delayed for a predetermined time period. This process is for correcting physical position of the incidenting laser beams 128 and 129 on the electrostatic drum 110 when an image is formed in the image forming unit 126 in accordance with control by the exposure controller 120, in short, for aligning positions of the incidenting laser beams on the electrostatic drum 110. After the black data is delayed in the buffer memory 305 for a predetermined time period, it is outputted to the printer 264.

It should be noted that, since the main body of the image processing apparatus 100 comprises the red developer 121 and the black developer 122, thus the apparatus 100 forms an image of red and black. However, the image formation in this embodiment is not limited to red and black, but any two colors which differ from each other can be used. Therefore, in this embodiment, following explanations use "a first color" and "a second color" instead of red and black. For example, in the above embodiment, a first color is red and a second color is black.

Figure 4:
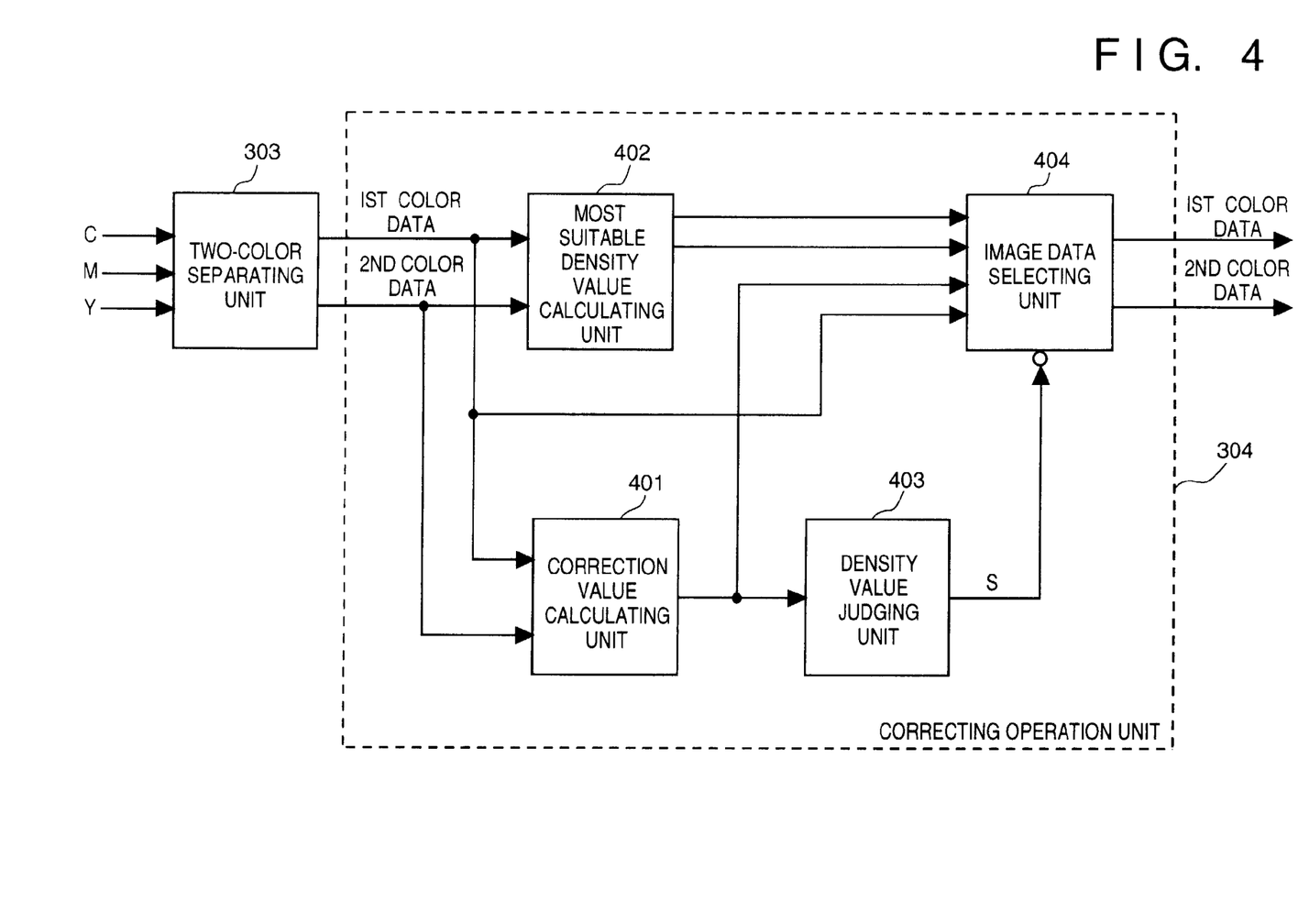
FIG. 4 is a block diagram showing a detailed configuration of a correcting operation circuit 304 according to the first embodiment.

The correcting operation unit 304 shown in FIG. 3 will be described below in detail with reference to FIG. 4. FIG. 4 is a block diagram showing a detailed configuration of the correcting operation unit 304.

In FIG. 4, reference numeral 401 denotes a correction value calculating unit for determining a correction value upon correcting a density value of a second color; 402, a most suitable density value calculating unit for determining a density value of the second color which is most suitable when it is out of the range of correction density value; 403, a density value judging unit for judging whether or not the correction value is in a predetermined range; and 404, an image data selecting unit for selecting image data to be outputted. The aforesaid units 401 to 404 construct the correcting operation unit 304. Proceedings in aforesaid each unit shown in FIG. 4 will be described below in detail.

Color information signals of the first color and the second color outputted from the two-color separating unit 303 both enter the correction value calculating unit 401. In the correction value calculating unit 401, by taking a light-shielding effect on a laser beam which lowers latent density values of the second color, caused by a toner image, formed in accordance with the color information signals of the first color, which adhere to the electrostatic drum 110, into consideration, a predetermined inverse operation is applied to density values of the color information signal of the second color. Then the corrected density values of the second color are outputted. The detailed process of the inverse operation will be described later in detail.

The corrected density values of the second color outputted from the correction value calculating unit 401 are inputted into the density value judging unit 403. The density value judging unit 403 judges whether or not each of the inputted corrected density values of the second color is over a maximum density value which is the limit of forming a latent image for the second color.

Generally, the maximum density value which is the limit to form a latent image is 255, thus, in a case where a density value of the second color inputted in the density value judging unit 403 is over 255, for instance, a S signal, outputted from the density value judging unit 403, for determining an image data to be outputted is high (H) level, and outputted to the image data selecting unit 404. Whereas, in a case where a density value of the second color inputted in the density value judging unit 403 is less than 255, a S signal, outputted from the density value judging unit 403, is low (L) level.

It should be noted that the density value judging unit 403 has only to judge whether or not each of the inputted corrected density values of the second color is in a predetermined range in which no inconvenience for forming a latent image is arisen, thus the comparison is not limited to comparison with the maximum density value for forming a latent image.

The image data selecting unit 404 judges that, when the S signal inputted from the density value judging unit 403 is H level, the corrected density value of the second color is over the maximum value, 255. Then, the image data selecting unit 404 outputs density value information of the first and second colors inputted from the most suitable density value calculating unit 402 which will be described later.

On the contrary, when the S signal is inputted to the image data selecting unit 404 as L level, density value information of the first color inputted from the two-color separating unit 303 and corrected density value information of the second color outputted from the correction value calculating unit 401 are outputted.

In the above-described correcting operation unit 304 shown in FIG. 4, when the density value of the second color inputted into the density value judging unit 403 is over 255, the corrected density value of the second color obtained in the correction value calculating unit 401 becomes invalid. Accordingly, density value of the second color which actually forms a latent image is lower than expected ideal density value to be outputted. Therefore, an actual density ratio of density value of the first color to the density value of the second color of latent images differs from a density ratio of the ideal density value of the first color to that of the second color. Thus, the reproduced color is not same as in the original. In order to avoid this problem, it is necessary to properly set a density value of the first color low in advance so as to prevent the density value of a latent image for the second color from being lowered by a large amount. However, if the density value of the first color is set too low, density values of formed latent images for both the first and second colors will also be too low, although the density ratio of the density value of the latent image for the first color to that of the second color is maintained.

Therefore, in this embodiment, when the corrected density value of the second color which is calculated in the correction value calculating unit 401 exceeds the maximum value (255), the most suitable density value calculating unit 402 calculates density values of the first and second colors which are most suitable for maintaining the density ratio of the ideal density value of the first color to that of the second colors, and for minimizing differences between the ideal density values of the first and second colors and density values of formed latent images for each color. Density values of each color, decided so that they are as close to the ideal density values as possible, to be outputted (most suitable density value) in this embodiment are referred as "target density values", hereinafter.

Below, a method for deciding the target density values by the most suitable density value calculating unit 402 will be explained with reference to a flowchart in FIG. 5.

Figure 5:
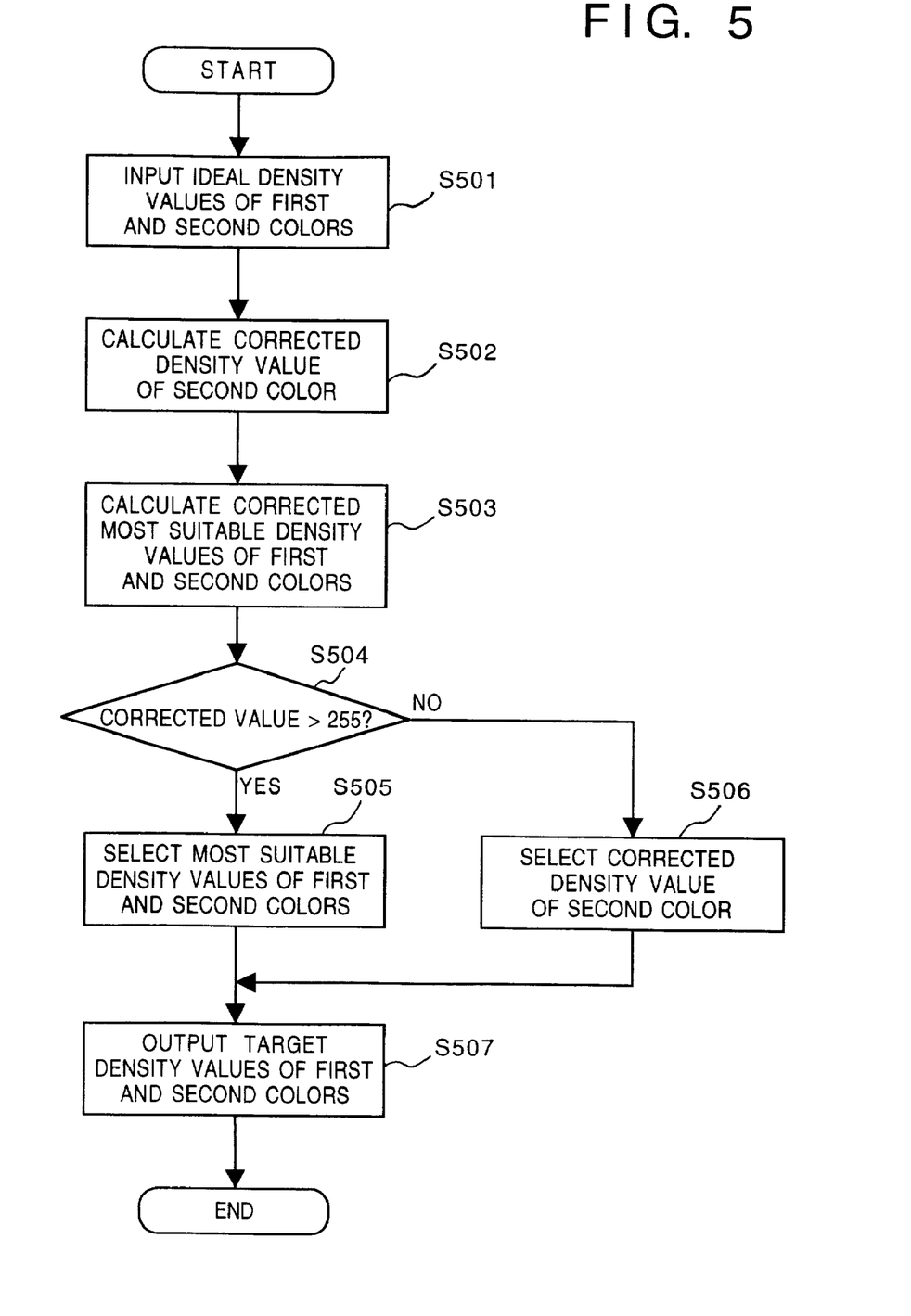
FIG. 5 is a flowchart showing a calculation process for a most suitable density value according to the first embodiment.

Referring to FIG. 5, the ideal density values of the first and second colors are inputted from the two-color separating unit 303 at step S501. The process proceeds to step S502 where the corrected density value of the second color is calculated in the correction value calculating unit 401 in accordance with the inverse operation.

Figure 6:
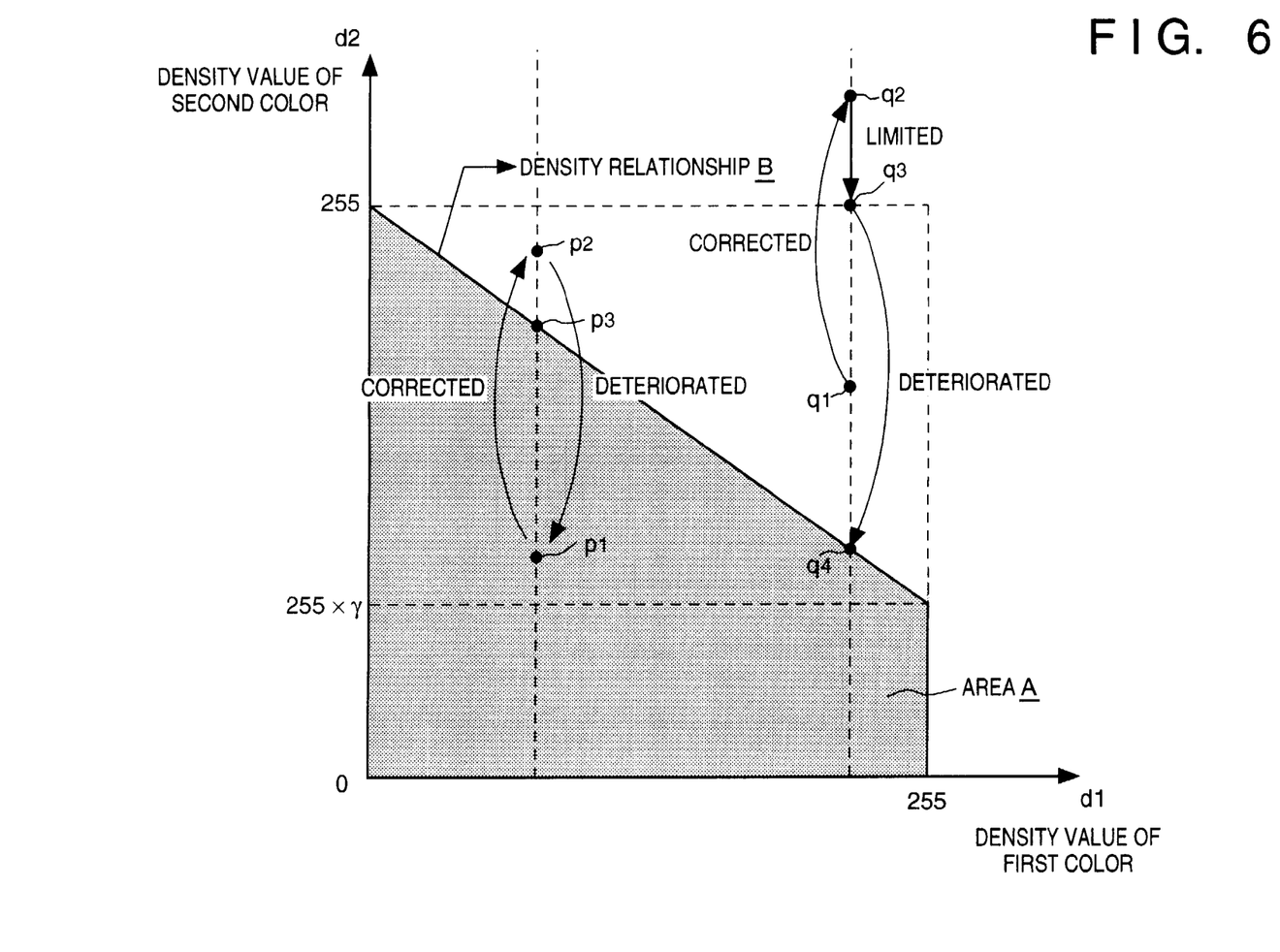
FIG. 6 is a graph showing density relationship between density values of two colors according to the first embodiment.

The inverse operation performed by the correction value calculating unit 401 will be described with reference to FIG. 6. FIG. 6 is a graph showing density relationship between two colors. In FIG. 6, a horizontal axis is for the density value (0~255) of the first color, and a vertical axis is for the density value (0~255) of the second color. An area A separated by the line of density relationship B is where both the first and the second colors can be expressed in the latent images. Note that, in this embodiment, a function of the density relationship B is stored in the ROM 207 in the controller 205 shown in FIG. 2 in advance.

In the first embodiment, it is assumed that the density relationship B between the first color and the second color, shown in FIG. 6, is linear. Further, when the density value of the first color is "255", let the density value of the second color be expressed by "255×γ".

When the ideal density values are denoted by p1 in FIG. 6 (the density value of the first color is denoted by $p1_1$ and the density value of the second color by $p1_2$, and p1 is expressed in coordinate notation ($p1_1$, $p1_2$), hereinafter), for instance, the inverse operation performed by the correction value calculating unit 401 is that a reciprocal of a deterioration rate of the density value of the second color with respect to the density value of the first color is multiplied by $p1_2$, and the obtained value is used as the corrected density value. More specifically, as an example of the ideal density values $p1(p1_1, p1_2)$, the density value of the first color to be outputted equals to the ideal density value $p1_1$, and the density value of the second color to be outputted is corrected in consideration of the light-shielding effect of the first color, which causes deterioration of the second color. Here, let an intersection on the line of the density relationship B at which the density value of the first color equals to $p1_1$ be p3 ($p3_1$, $p3_2$), then the corrected density value of $p1_2$, expressed by $p1_2'$, can be obtained by calculating following equation (1), $$p1_2' = p1_2 \times 255/p3_2 \tag{1}$$

Therefore, as shown in FIG. 6, when $p1_2 < p3_2$, the deterioration of the second color can be prevented by developing images in accordance with the corrected value calculated in accordance with the equation (1).

However, if $p1_2 > p3_2$, then the corrected density value $p1_2'$ exceeds the limit density value "255". Accordingly, the calculation for obtaining the most suitable density value (target density value) performed at step S503, described later, is necessary.

At step S503, the target density values of the first and second colors are calculated by the most suitable density value calculating unit 402. Note that, in FIG. 5, the processes at step S502 and step S503 can be performed in a reverse order.

Figure 7:
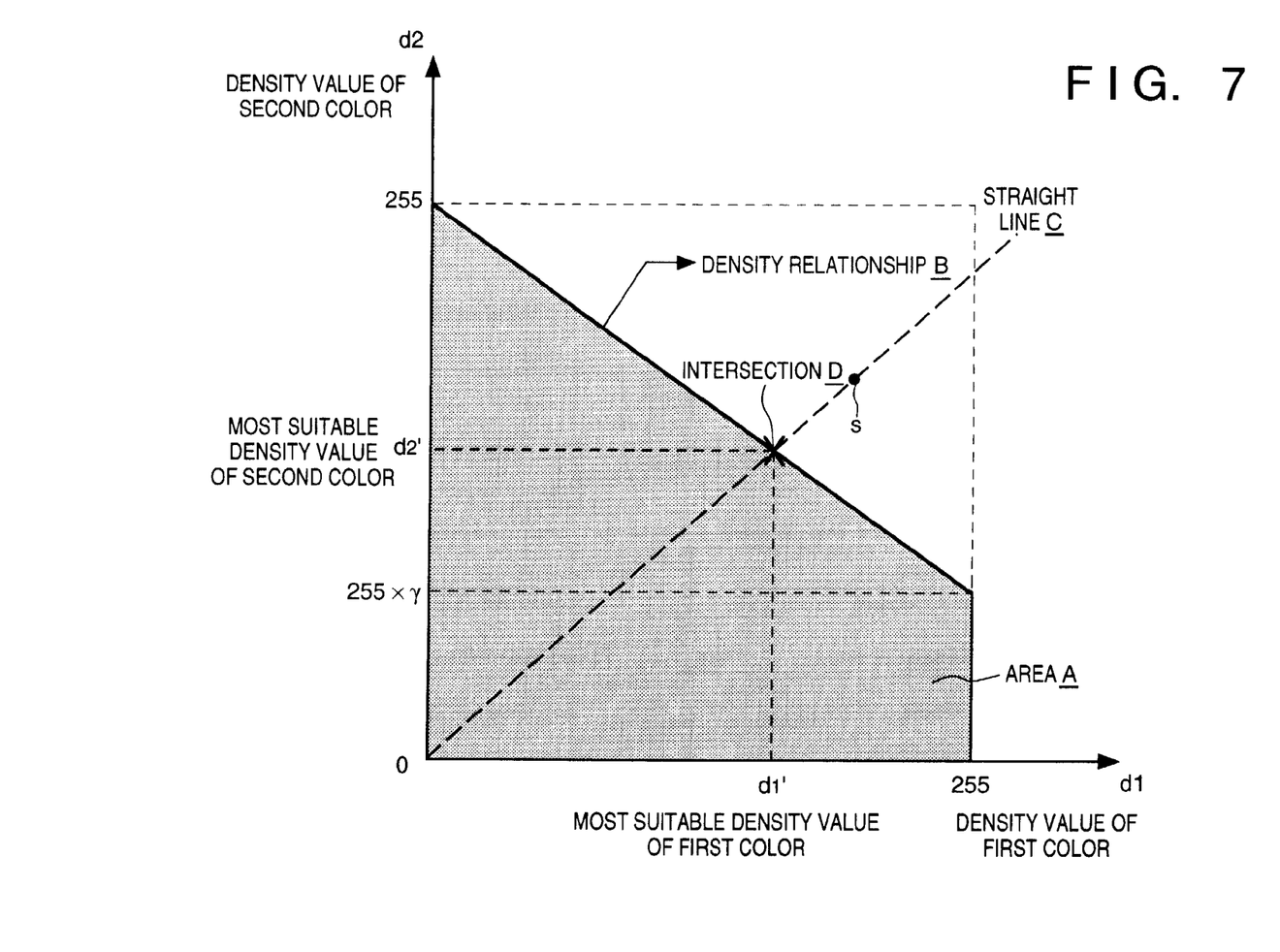
FIG. 7 is a graph for explaining calculation of the most suitable density value according to the first embodiment.

Referring to FIGS. 6 and 7, the method for calculating the target density values of the first and second colors at step S503 will be explained.

In FIG. 6, if the ideal density values of the first and second colors inputted from the two-color separating unit 303 is at p1 which is inside of the area A, the corrected density value of the second color calculated by the correction value calculating unit 401, shown in FIG. 4, is the value described by a point p2 which is lower than the limit value, "255", as described above. Then, when a latent image is actually formed with assumption that the point p2 is the target value, because of the deterioration of the second color caused by the light-shielding effect of the first color, the latent image of density value p1 is formed. Namely, the ideal density value p1 is maintained.

On the contrary, if the ideal density values are denoted by a point q1 which is in outside of the area A, the corrected density value of the second color calculated by the correction value calculating unit 401 becomes a value denoted by a point q2 which exceeds the maximum value "255". However, since the limit of the corrected density value is "255", a point for target density values, q3, is decided so that the target density value of the second color is "255". Then, when a latent image is actually formed by assuming the coordinates of the point q3 as the target density values, the density value of the second color is decreased by the same difference as a difference between the density values at the point q1 and the point q2. As a result, a latent image formed on the basis of the density values at point q4 is formed. Therefore, the density value of the second color is deteriorated comparing to the ideal density value q1, and the density values of the formed latent images are always on the line of the density relationship B.

At step S503, the target density value is calculated in order to keep the decrease of the density value minimum. Below, a method for calculating the target density value will be explained with reference to FIG. 7.

FIG. 7 is a graph for explaining a method for setting the most suitable density value (target density value). In FIG. 7, horizontal and vertical axes are for the density values of the first and second colors, respectively, as in the FIG. 6, and the density relationship B and the area A denotes the same as in FIG. 6.

In FIG. 7, a point s denotes ideal density values set outside of the area A and has the same coordinates values as those of the point q1 in FIG. 6. Further, a straight line C connecting the point s and the origin (density values of each color are "0") is a collection of density value points having equal density ratio of the target density values at the point s. In other words, existence of any density value points having the equal density ratio to that of the point s always exist on the straight line C. Then, among points on the straight line C and inside of the area A, coordinate values of a point having the maximum density values, namely an intersection D of the density relationship B and the straight line C, are the most suitable density values which maintain the density ratio of the ideal density values and minimize the deterioration of the density values.

In this embodiment, density values at an intersection D are calculated by the most suitable density value calculating unit 402, and set as target density values, namely the most suitable density values. A method for finding the intersection D will be described below.

Referring to FIG. 7, let each density value of the first color and the second color be d1 and d2, respectively, and let the density ratio at the point s having coordinates of the ideal density values be n, then the straight line C can be expressed by following equation (2).

$$d2 = n \times d1 \tag{2}$$

Further, if r is a slope of a function of the density relationship B, then the function is expressed by equation (3).

$$d2 = 255 - (1-r) \times d1 \tag{3}$$

By combining the equations (2) and (3), the intersection D(d1', d2'), which is the point having coordinates of most suitable density values, of the straight lines expressed by the equations (2) and (3) are obtained in accordance with following equations (4) and (5).

$$d1' = 255/(1-r+n) \tag{4}$$

$$d2' = (255 \times n)/(1-r+n) \tag{5}$$

As described above, when the point s having ideal density values as coordinate values exists outside of the area A, by obtaining the coordinate values of the intersection D which represent the most suitable density values, the most suitable target density values are set. Therefore, when latent images are actually formed, the density ratio of the ideal density value of the first color to that of the second color can be maintained. Accordingly, it is possible to minimize the deterioration of density values of each color.

At step S503 in FIG. 5, the most suitable density values of the first and second colors are calculated as described above.

Then the process proceeds to step S504 where the density value judging unit 403 determines whether or not the corrected density value of the second color calculated at step S502 is over "255". If it is, the process moves to step S505, and the image data selecting unit 404 selects the most suitable density values of the first and second colors outputted from the most suitable density value calculating unit 402 as the target density values in accordance with the S signal indicating the H level, outputted from the density value judging unit 403. Then, the process proceeds to step S507.

Whereas, if it is determined that the corrected density value of the second color is less or equal to the maximum value, "255", at step S504, then the process proceeds to step S506. At step S506, the image data selecting unit 404 selects the corrected density value of the second color outputted from the correction value calculating unit 401 and the density value of the first color inputted from the two-color separating unit 303 as the target density values, and the process moves to step S507.

At step S507, a target density value signal of the first color and a target density value signal of the second color are separately outputted from the correcting operation unit 304 to the printer 204.

According to the first embodiment as described above, if the corrected values of the ideal density values obtained by separating two colors exceed the maximum density value which is the limit for forming a latent image, it is possible to set target density values which are corrected so as to maintain the density ratio of the ideal density value of the first color to that of the second color and minimize the decrease of each density value. Accordingly, by forming an image based on the target density values, it is possible to form an image of two colors on a single electrostatic drum, with maintaining color balance, in a single routine in a good condition.

Second Embodiment

A second embodiment of the present invention is described below.

The construction of an image processing apparatus of the second embodiment is the same as that of the first embodiment, thus the explanation is omitted.

In the aforesaid first embodiment, it is assumed that the density relationship between the density values of the first and second colors are linear, and the most suitable density value is calculated by using an equation showing the density relationship. However, in a practical image processing apparatus, it is a rare case that the density relationship between density values of the first color and the second color is linear, and the density relationship usually has non-linear relationship, discrete relationship, for instance. In the second embodiment, referring to FIG. 8, a case where the density relationship between density values of first color and the second color are non-linear is explained.

Figure 8:
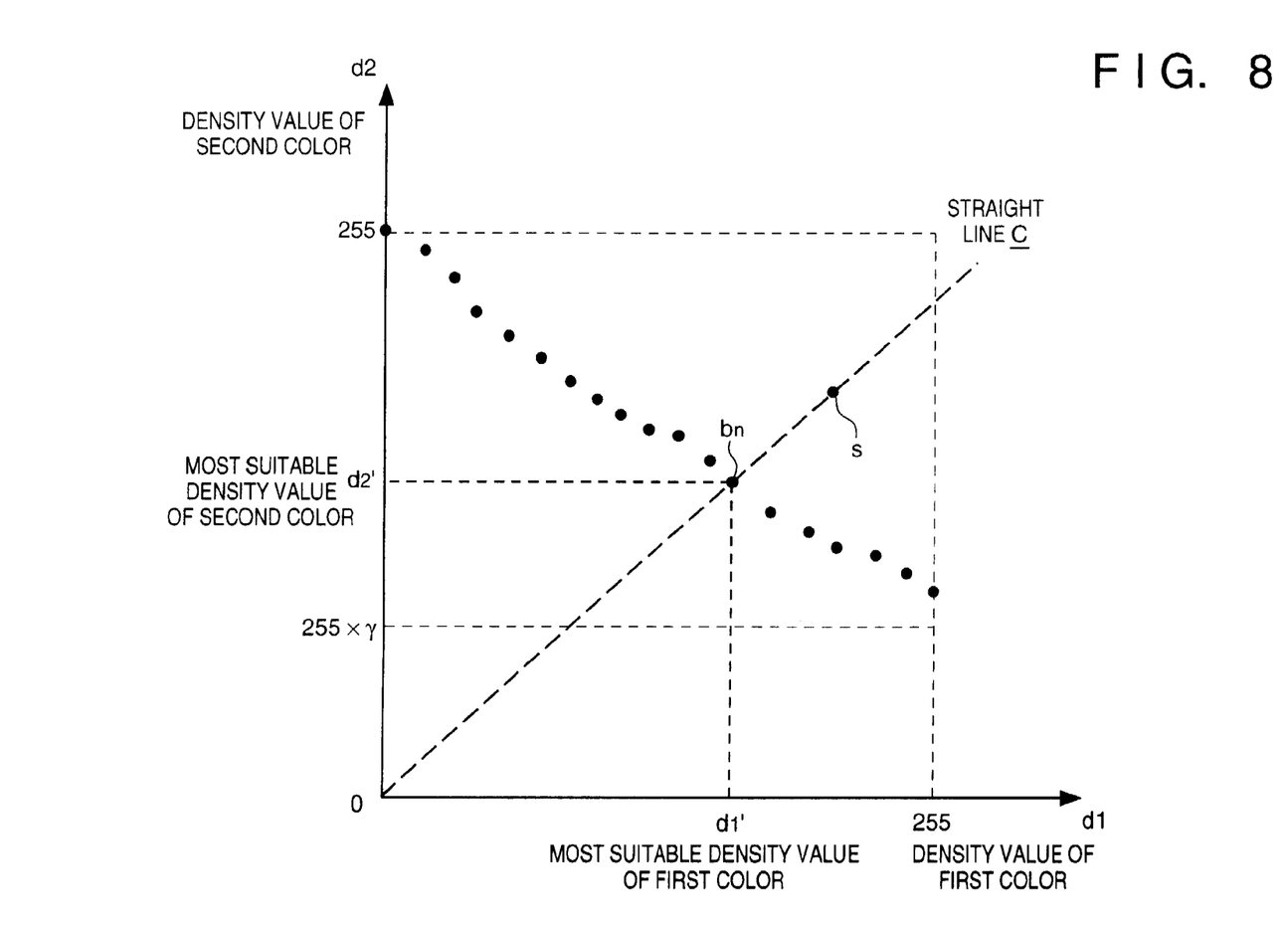
FIG. 8 is a graph for explaining calculation of the most suitable density value according to a second embodiment of the present invention.

FIG. 8 is a graph for explaining a method for setting the most suitable density value in the second embodiment. It should be noted that an operation for calculating the most suitable density value which will be described below is also performed by the most suitable density value calculating unit 402 shown in FIG. 4 in the second embodiment.

In FIG. 8, horizontal and vertical axes are for density values of the first and second colors, respectively, as in FIG. 7, and the area A denotes the same as in the FIG. 7. Further, the point s having the ideal density values as its coordinate values and the density ratio straight line C are the same as those in the FIG. 7.

In FIG. 8, since the density relationship between density values of the first and second colors are non-linear, thus it can not be expressed by a straight line, which differs from the FIGS. 6 and 7. Therefore, a point having the most suitable density values as its coordinate values can not be calculated by finding an intersection of the line of the density relationship and the density ratio straight line C in the second embodiment.

Therefore, in the second embodiment, if data expressing the limits of the density values of the second color corresponding to the density values of the first color can be obtained discretely, by finding a shortest distance between a discrete point and the straight line C, connecting an arbitrary point s having ideal density values as its coordinate values and the origin, the discrete point is decided as a point having the target density values as its coordinate values. More specifically, in FIG. 8, by selecting a point, bn, where the distance between the point bn and the straight line C becomes shortest, the most suitable density values can be obtained.

The substantial processes are the same as those in the first embodiment, and an image signal of the first color (red) and an image signal of the second color (black) are independently outputted from the correcting operation unit 304 to the printer 204.

In the second embodiment as described above, if the point s having the ideal density values as its coordinate values exists outside of the area A where a latent image can be formed, by obtaining the most suitable density value point bn, the most suitable target density values can be set. Accordingly, the density ratio of the identical density value of the first color to that of the second color is maintained as in good condition as possible, and the decrease of density values of each color can be minimized.

It should be noted that the correction value calculating unit 401 in the second embodiment calculates the corrected density value of the second color in a following manner. First, a discrete point having a density value of the first color which is closest to the ideal density value of the first color at point s is found, then the inverse operation, described above in the first embodiment, is performed on the density value of the second color at the discrete point. Then the corrected density value of the second color is determined.

According to the present invention as described above, when the density value of a first color, obtained by separating two colors, for forming a first latent image affects density value of a second color for forming a second latent image, although the corrected density value of the ideal density value exceeds the maximum value, it is possible to set the most suitable target density values which minimizes decrease of density values of each colors while keeping the density ratio of a density value of the first color to that of the second color. Accordingly, in the image processing apparatus forming an image of at least two colors, when an image of two colors are collectively formed on a single image holding member, such as an electrostatic drum, an image maintaining density values of each color and ratio of a density value of the first color to that of the second color can be obtained in good condition.

It should be noted that, in the above embodiment, the two colors, collectively transferred, are not limited to red and black and can be three colors of red, blue, and black, or a plurality of colors more than three colors. Further, the present invention is not limited to image forming using toner, and can be applied to other image forming methods using other recording material.

Furthermore, the corrected density value is selected in accordance with whether or not the corrected density value exceeds the maximum value, "255", however, the threshold is not limited to "255". It can be set any time in accordance with characteristics of an image to be processed and with characteristics of an image forming apparatus.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore to appraise the public of the scope of the present invention, the following claims are made.

What is claimed is:

1. An image processing apparatus which provides image data to an image forming apparatus capable of forming an image by overlaying recording material of at least two colors, comprising:

separating means for separating color image data into at least two color components;

first correcting means for performing correction on the image data separated by said separating means in consideration of light-shielding effect on an image represented by the image data;

second correcting means for performing correction on the image data separated by said separating means in consideration of a density ratio of the image data; and processing means for processing the image data separated by said separating means by using said first correcting means and said second correcting means.

2. The image processing apparatus according to claim 1, wherein said first correcting means performs correction in consideration of light-shielding effect of an image of a color component which is formed in prior.

3. The image processing apparatus according to claim 2, wherein said first correcting means performs correction on an image of a color component which is formed later.

4. The image processing apparatus according to claim 3, wherein said first correcting means performs correction to increase a density value of the image of the color component which is formed later.

5. The image processing apparatus according to claim 1, wherein said second correction means performs correction in consideration of density ratios of all images of each color component separated by said separating means.

6. The image processing apparatus according to claim 1, wherein said processing means has selecting means for selecting the corrected result by said second correcting means when the corrected result by said first correcting means is in outside of a predetermined range.

7. The image processing apparatus according to claim 6, wherein said selecting means selects the corrected result by said second correcting means when the corrected result by said first correcting means exceeds a predetermined value.

8. The image processing apparatus according to claim 7, wherein the predetermined value is a maximum density value with which an image can be formed by the image forming apparatus.

9. An image processing apparatus which provides image data to an image forming apparatus capable of forming an image by overlaying recording material of at least two colors, comprising:

separating means for separating color image data into at least two color component image data;

first correcting means for performing correction on second color component image data representing an image formed later, out of the color component data separated by said separating means, in consideration of light-shielding effect of an image, represented by first color component image data, which is formed in prior;

second correcting means for performing correction so as to maintain a density ratio of the first color component image data to the second color component image data separated by said separating means;

comparing means for comparing a density value of the second color component image data corrected by said first correcting means with a predetermined value; and selecting means for selecting either a corrected result by said first correcting means or a corrected result by said second correcting means in accordance with a comparison result by said comparing means.

10. The image processing apparatus according to claim 9, wherein, when the comparing means determines that the density value of the second color component image data corrected by said first correcting means exceeds the predetermined value, said selecting means selects the first color component data and the second color component data both corrected by said second correcting means.

11. The image processing apparatus according to claim 10, wherein the predetermined value is a maximum density value with which an image can be formed by the image forming apparatus.

12. The image processing apparatus according to claim 9, wherein, when the comparing means determines that the density value of the second color component image data corrected by said first correcting means is less or equal to the predetermined value, said selecting means selects the first color component data separated by said separating means and the second color component data corrected by said first correcting means.

13. The image processing apparatus according to claim 10 or 12, wherein the predetermined value is a maximum density value with which an image can be formed by the image forming apparatus.

14. An image processing apparatus which provides image data to an image forming apparatus capable of forming an image by overlaying recording material of at least two colors, comprising:

separating means for separating color image data into at least two color component image data;

first correcting means for performing correction on second color component image data representing an image formed later, out of the color component data separated by said separating means, in consideration of light-shielding effect of an image, represented by first color component image data, which is formed in prior;

second correcting means for performing correction so as to maintain a density ratio of the first color component image data to the second color component image data separated by said separating means;

comparing means for comparing a density value of the second color component image data corrected by said first correcting means with a predetermined value; and selecting means for selecting the first color component image data and the second color component image data in accordance with a comparison result by said comparing means.

15. The image processing apparatus according to claim 14, wherein said first correcting means performs correction so as to increase a density value of said second color component image data in advance by an amount which will decrease during forming an image by the image forming apparatus because of the light-shielding effect of the first color component image data.

16. The image processing apparatus according to claim 14, wherein said second correcting means performs correction so as to minimize changes in density values of the first color component image data and the second color component image data.

17. The image processing apparatus according to claim 14, wherein, when the comparing means determines that the density value of the second color component image data corrected by said first correcting means exceeds the predetermined value, said selecting means selects the first color component data and the second color component data both corrected by said second correcting means.

18. The image processing apparatus according to claim 17, wherein the predetermined value is a maximum density value with which an image can be formed by the image forming apparatus.

19. The image processing apparatus according to claim 14, wherein, when the comparing means determines that the density value of the second color component image data corrected by said first correcting means is less or equal to the predetermined value, said selecting means selects the first color component data separated by said separating means and the second color component data corrected by said first correcting means.

20. The image processing apparatus according to claim 19, wherein the predetermined value is a maximum density value with which an image can be formed by the image forming apparatus.

21. An image processing method which provides image data to an image forming apparatus capable of forming an image by overlaying recording material of at least two colors, comprising:

a separating step of separating color image data into at least two color components;

a first correcting step of performing correction on image data separated at said separating step in consideration of light-shielding effect on an image represented by the image data;

a second correcting step of performing correction on the image data separated at said separating step in consideration of a density ratio of the image data; and a processing step of processing the image data separated at said separating step at said first correcting step and said second correcting step.

22. An image processing method which provides image data to an image forming apparatus capable of forming an image by overlaying recording material of at least two colors, comprising:

a separating step of separating color image data into at least two color component image data;

a first correcting step of performing correction on second color component image data representing an image formed later, out of the color component data separated at said separating step, in consideration of light-shielding effect of an image, represented by first color component image data, which is formed in prior;

a second correcting step of performing correction so as to maintain a density ratio of the first color component image data to the second color component image data separated at said separating step;

a comparing step of comparing a density value of the second color component image data corrected at said first correcting step with a predetermined value; and a selecting step of selecting either a corrected result at said first correcting step or a corrected result at said second correcting step in accordance with a comparison result at said comparing step.

23. An image processing method which provides image data to an image forming apparatus capable of forming an image by overlaying recording material of at least two colors, comprising:

a separating step of separating color image data into at least two color component image data;

a first correcting step of performing correction on second color component image data representing an image formed later, out of the color component data separated at said separating step, in consideration of light-shielding effect of an image, represented by first color component image data, which is formed in prior;

a second correcting step of performing correction so as to maintain a density ratio of the first color component image data to the second color component image data separated at said separating step;

a comparing step of comparing a density value of the second color component image data corrected at said first correcting step with a predetermined value; and a selecting step of selecting the first color component image data and the second color component image data in accordance with a comparison result at said comparing step.

24. An image processing method which provides image data to an image forming apparatus capable of forming an image by overlaying recording material of a plurality of colors, comprising:

a generating step of generating data of a plurality of color components each of which corresponds to each of a plurality of colors of recording material; and an adjusting step of adjusting the data of the plurality of color components so that a color tone expressed on the basis of the adjusted data of the plurality of color components corresponds to a ratio of the data of the plurality of color components.

* * * * *

UNITED STATES PATENT AND TRADEMARK OFFICE
CERTIFICATE OF CORRECTION

PATENT NO. : 5,946,112

DATED : August 31, 1999

INVENTOR : NORIYUKI KOBAYASHI

It is certified that error appears in the above-identified patent and that said Letters Patent is hereby corrected as shown below:

COLUMN 1:

Line 15, "scan" should read --scans--.
Line 33, "in prior" should be deleted.

COLUMN 2:

Line 2, "in" should be deleted.
Line 35, "in prior" should be deleted.
Line 56, "in prior" should be deleted.

COLUMN 7:

Line 4, "printer 264" should read --printer 204--.

COLUMN 9:

Line 30, "$p1_2 < p3_2$" should read --$p1_2 \leq p3_2$
Line 48, "is" should read --are--.

UNITED STATES PATENT AND TRADEMARK OFFICE
CERTIFICATE OF CORRECTION

PATENT NO. : 5,946,112

DATED : August 31, 1999

INVENTOR : NORIYUKI KOBAYASHI

It is certified that error appears in the above-identified patent and that said Letters Patent is hereby corrected as shown below:

COLUMN 13:

Line 43, "in prior" should be deleted.
Line 59, "in" should be deleted.

COLUMN 14:

Line 12, "in prior" should be deleted.

COLUMN 16:

Line 8, "in prior" should be deleted.
Line 32, "in prior" should be deleted.

Signed and Sealed this

Eleventh Day of July, 2000

Attest:

Q. TODD DICKINSON

*Attesting Officer*   *Director of Patents and Trademarks*